United States Patent
Infante Suarez et al.

(10) Patent No.: US 10,789,231 B2
(45) Date of Patent: Sep. 29, 2020

(54) SPATIAL INDEXING FOR DISTRIBUTED STORAGE USING LOCAL INDEXES

(71) Applicant: ORACLE INTERNATIONAL CORPORATION, Redwood Shores, CA (US)

(72) Inventors: Roberto Infante Suarez, Guadalajara (MX); Juan Carlos Reyes Martinez, Guadalajara (MX); Hector Alejandro Saucedo Briseno, Guadalajara (MX); Siva Ravada, Nashua, NH (US); Zazhil Ha Herena Ulloa, Zapopan (MX)

(73) Assignee: Oracle International Corporation, Redwood Shores, CA (US)

( * ) Notice: Subject to any disclaimer, the term of this patent is extended or adjusted under 35 U.S.C. 154(b) by 683 days.

(21) Appl. No.: 15/248,155

(22) Filed: Aug. 26, 2016

(65) Prior Publication Data

US 2017/0337229 A1 Nov. 23, 2017

Related U.S. Application Data

(60) Provisional application No. 62/338,686, filed on May 19, 2016.

(51) Int. Cl.
 *G06F 16/22* (2019.01)
 *G06F 16/29* (2019.01)

(52) U.S. Cl.
 CPC ...... *G06F 16/2272* (2019.01); *G06F 16/2237* (2019.01); *G06F 16/2246* (2019.01); *G06F 16/29* (2019.01)

(58) Field of Classification Search
 USPC ........................................................ 707/743
 See application file for complete search history.

(56) References Cited

U.S. PATENT DOCUMENTS 6,674,445 B1 * 1/2004 Chithambaram ....... G06T 17/05
 345/619
7,877,405 B2 1/2011 Kothuri et al.
 (Continued)

OTHER PUBLICATIONS

Cary, Ariel, et al. "Experiences on processing spatial data with mapreduce." International Conference on Scientific and Statistical Database Management. Springer, Berlin, Heidelberg, 2009. (Year: 2009).*

(Continued)

*Primary Examiner* — Mohsen Almani
(74) *Attorney, Agent, or Firm* — Kraguljac Law Group, LLC

(57) ABSTRACT

Systems, methods, and other embodiments associated with indexing spatial data in a distributed file system using local indexes are described. In one embodiment, a method includes dividing the spatial data into splits. Each of the splits includes a portion of the spatial data and includes additional sub-units that further sub-divide the spatial data. The example method may also include populating index records for the sub-units using metadata extracted from the spatial data. The metadata for each of the sub-units describes sub-unit characteristics of a respective one of the sub-units and split characteristics of one of the splits associated with the respective one of the sub-units. The method includes indexing the spatial data by generating local indexes using the index records with one of the local indexes for each of the splits and generating a global index that identifies the local indexes.

20 Claims, 7 Drawing Sheets

(56) References Cited

U.S. PATENT DOCUMENTS

| | | | |
|---|---|---|---|
| 8,386,468 | B2 | 2/2013 | Hu et al. |
| 8,533,181 | B2 | 9/2013 | Hu et al. |
| 2005/0055376 | A1* | 3/2005 | Xie .................... G06F 16/50 |
| 2005/0091223 | A1* | 4/2005 | Shaw ................. G06F 16/289 |
| 2007/0253642 | A1 | 11/2007 | Berrill et al. |
| 2011/0276592 | A1* | 11/2011 | Gautama ............. G01C 21/32 |
| | | | 707/769 |
| 2012/0054195 | A1 | 3/2012 | Hu et al. |

OTHER PUBLICATIONS

Cary, Ariel, et al. "Leveraging cloud computing in geodatabase management." Granular Computing (GrC), 2010 IEEE International Conference on. IEEE, 2010. (Year: 2010).*

Giachetta, Roberto. "A framework for processing large scale geospatial and remote sensing data in MapReduce environment." Computers & Graphics 49 (2015): 37-46. (Year: 2015).*

Dowers, Steve, Bruce M. Gittings, and Mike J. Mineter. "Towards a framework for high-performance geocomputation: handling vector-topology within a distributed service environment." Computers, Environment and Urban Systems 24.5 (2000): 471-486. (Year: 2000).*

Sengupta, Raja, and Chen Yan. "A Hybrid Spatio-Temporal Data Model and Structure (HST-DMS) for Efficient Storage and Retrieval of Land Use Information." Transactions in GIS 8.3 (2004): 351-366. (Year: 2004).*

Wu, Xiaqing, et al. "Automatic alignment of large-scale aerial rasters to road-maps." Proceedings of the 15th annual ACM international symposium on Advances in geographic information systems. 2007. (Year: 2007).*

* cited by examiner

SPATIAL INDEXING FOR DISTRIBUTED STORAGE USING LOCAL INDEXES

CROSS REFERENCE TO RELATED APPLICATIONS

This disclosure claims the benefit of U.S. Provisional Patent Application Ser. No. 62/338,686 filed May 19, 2016, titled "Spatial Indexing For Distributed Storage Using Local Indexes" inventors: Infante-Suarez et al., and assigned to the present assignee.

BACKGROUND

Spatial data is information that represents objects defined in a geometric space. For example, spatial data may include map data that describes geographic features and boundaries (i.e., roads, rivers, political boundaries, etc.) within a spatial coordinate system (e.g., longitude and latitude). Spatial data may take different forms, such as vector data or raster data. Vector data describes geometries within a coordinate system using points, lines and polygons to represent elements. By contrast, raster data includes images (e.g., satellite photos) that graphically represent locations in the coordinate system.

Storing and querying spatial data can be a complex task. As one example, consider spatial data used for mapping purposes. The spatial data for mapping can include large quantities of both raster data and vector data when mapping even just a single county or municipality. Thus, when mapping broader areas, the amount of data can quickly exceed gigabytes, if not terabytes or greater.

Accordingly, locating a particular portion of the spatial data can be a difficult task when such a large amount of data is present. Adding to this difficulty is the nature of the spatial data itself. Because the spatial data does not generally include comprehensive descriptive information, identifying raster images or vector data beyond using a basic coordinate for a location of the respective data may not be possible.

Consequently, when searching the spatial data, search results may be inaccurate because of the limited descriptive information available for searching. Therefore, additional searches may be executed subsequently in attempts to cure the inaccuracies. However, the subsequent searches lead to computing system inefficiencies and increased usage of resources caused by performing multiple redundant accesses across systems to identify desired data. Thus, prior systems and methods suffer from difficulties associated with inefficient indexing and storage of spatial data.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
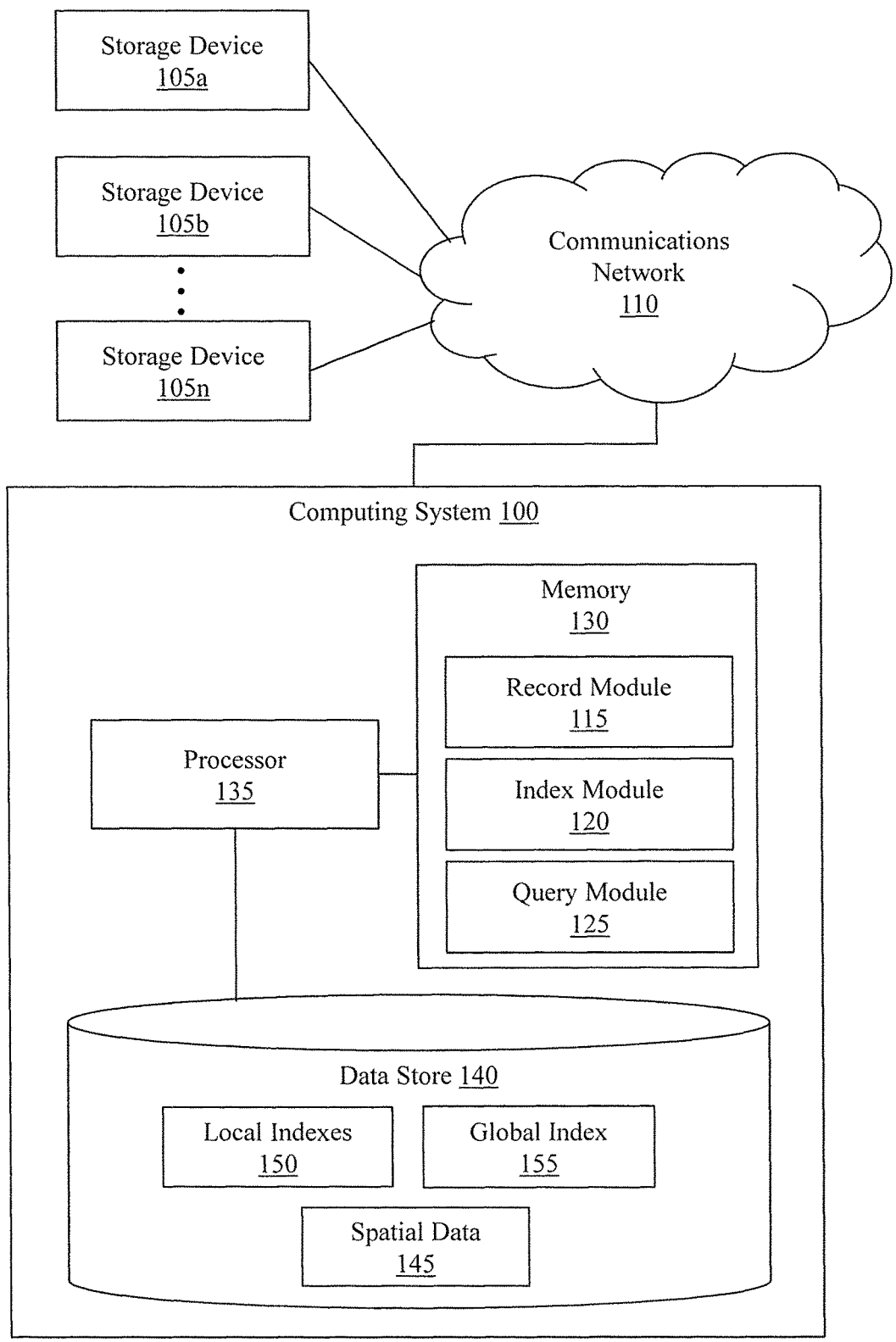
FIG. 1 illustrates one embodiment of a system associated with robust indexing of spatial data using local indexes.

Computerized systems and methods are described herein that provide for indexing spatial data stored in a distributed file system using local indexes. As mentioned in the background, in general, spatial data can be difficult to index and, thus, also difficult to query. As one example, spatial data that includes raster images depicts information graphically and not textually as with standard textual database content. Accordingly, a raster index of the raster images may specify simple coordinates for each of the raster images without detail about content or more specific details about sub-regions of the image. Consequently, a query to the raster index returns whole images without specificity regarding characteristics of the raster images themselves.

Similarly, vector data describes elements in a spatial coordinate system using points, lines, and polygons. Thus, a vector index may specify coordinates of the vector data without fuller detail. Thus, a query to the vector index may suffer the same inaccuracies as the raster index in regards to providing results that are, for example, overly broad.

Moreover, additional difficulties relate to using separate indexes for raster data and vector data. Therefore, a computing system uses separate access/block reads for the separate types of spatial data. Further inefficiencies arise when, for example, the spatial data is stored in a distributed file system because different nodes store the data and thus each access to a block of data and each additional access may produce an additional network communication. Thus, a query to obtain map information about a particular locality results in two separate block reads/accesses and thus, additional communications impacting an overall efficiency of the distributed file system. Thus, the general configuration of separate indexes for different data types leads to inefficiencies in the distributed file system.

Accordingly, in one embodiment, a computing system is disclosed that generates the spatial index with index records for both raster data and vector data so that both types of spatial data are indexed together to avoid redundant accesses to separate indexes for the different data types. Moreover, the computing system provides for additional efficiencies by generating indexes for the spatial data with index records that include extra fields specifying additional details about the spatial data. The additional details permit more robust queries to the spatial data by further refining which spatial data is selected using the additional details.

Additionally, the computing system may also generate the index records to correlate with a finer granularity of the spatial data. For example, the computing system splits raster images into tiles that are then indexed instead of indexing raster images at a granularity of a whole image. Indexing the tiles instead of the whole raster image provides more specific and refined results.

When implemented in a distributed file system, the combined spatial index with the other noted improvements, improve functioning of the distributed file system by reducing communications and accesses between nodes. For example, by the general nature of the distributed file system, the spatial data is distributed across many different nodes/devices. Thus, the computing system generates a local index for portions of the spatial data at a particular node and with additional information for better identifying the desired spatial data. In this way, searching the spatial data using the indexes is more efficient from fewer accesses to the spatial data and by avoiding network communications associated with redundant accesses.

With reference to FIG. 1, one embodiment of a computing system 100 related to generating indexes for spatial data stored in a distributed file system is illustrated. In one embodiment, the computing system 100 is a computing/data processing system including an application or collection of distributed applications for enterprise organizations. The applications and computing system 100 may be configured to operate with or be implemented as a cloud-based networking system, a software as a service (SaaS) architecture, a node in a cluster computing system or another type of networked computing solution. In one embodiment, the computing system 100 is a centralized server-side application that provides at least the computerized functions disclosed herein and that electronically communicates with a plurality of nodes (e.g., storage devices 105a, b . . . n) over a computer communications network 110.

The storage devices 105a, 105b through 105n (also referred to as mappers herein) in combination with the computing system 100 form a distributed file system. In other words, the computing system 100 and the storage devices 105a, 105b through 105n operate together to store data. The computing system 100, in one embodiment, is a master node that controls other nodes (e.g., devices 105a-n) of the distributed file system.

In one embodiment, the distributed file system is a Hadoop distributed file system (HDFS) that stores spatial data. Accordingly, the devices in the distributed tile system act together to store the spatial data (e.g., spatial data 145). Additionally, computing system 100 may cooperate with device 105a-n to split and process the spatial data 145 in parallel, as will be discussed in greater detail subsequently. Consequently, in one embodiment, the storage devices 105a, 105b through 105n are configured with components similar to computing device components illustrated as part of the computing system 100 as shown in FIG. 1.

For example, in one embodiment, one or more of the components of the computing system 100 are embodied as program modules (Record module 115, Index module 120, Query Module 125) stored in a memory 130 of the computing system 100. The program modules are configured with instructions that when executed by at least a processor 135 cause the computing system 100 to perform the corresponding function(s).

The processor 135 is, for example, a hardware processing unit, such as, a microprocessor, central processing unit (CPU), application-specific integrated circuit (ASIC), or similar hardware device. The processor 135 is connected via circuitry (e.g., a bus) to the memory 130 and to the data store 135 via one or more input/output controllers. The memory 130 is, for example, a non-transitory memory such as a cache memory of a processor, a flash memory, a random access memory (RAM), or another memory that stores instructions executed by the processor 135 that comprise the record module 115, the index module 120 and the query module 125.

Similarly, the data store 140 is, for example, a random access memory (RAM), flash memory, hard-disk drive or similar volatile or non-volatile computer-storage media. Accordingly, the processor 135 uses the data store 140 and/or the memory 130 to store various data when performing the disclosed functions. As shown in FIG. 1, the data store 140 is integrated with the computing system 100. Of course, in other embodiments, the data store 140 is implemented as a distributed storage that is shared among the devices 105a-n and the computing system 100 of the distributed file system.

In either case, the data store 140 stores the spatial data 145, local indexes 150 and a global index 155. As previously discussed, the spatial data 145 is data that describes elements in a spatial coordinate system. The spatial coordinate system may be a geographic coordinate system (e.g., longitude and latitude), a computer-based modeling or rendering coordinate system (e.g., Cartesian coordinates), and so on. As used herein, the spatial data 145 relates to spatial data that includes raster data and vector data. The raster data comprises separate raster images that are images (i.e., satellite photos, aerial photos, etc.) with rows and columns of pixels that depict information graphically. The vector data includes information defining different geometries (i.e., points, lines, polygons) that together represent elements (e.g., roads, rivers, political boundaries, etc.) in the spatial coordinate system.

Moreover, while the spatial data 145 is discussed in relation to satellite images and map data, in further embodiments, data is characterized as spatial data upon having a single spatial component, i.e., a location in a spatial coordinate system. For example, the spatial data 145 may include text messages with a location from where the text messages sent, photos taken at particular locations, census data with addresses, and so on.

With continued further reference to FIG. 1, the data store 140 further includes the local indexes 150 and global index 155. While the data store 140 is illustrated as storing the spatial data 145, the local indexes 150, and the global index 155, of course, this data may be stored within the distributed file system, and thus the data is distributed among the devices 105a-n and the computing system 100. The data store 140 is shown as storing the specific data elements for purposes of discussion.

Figure 2:
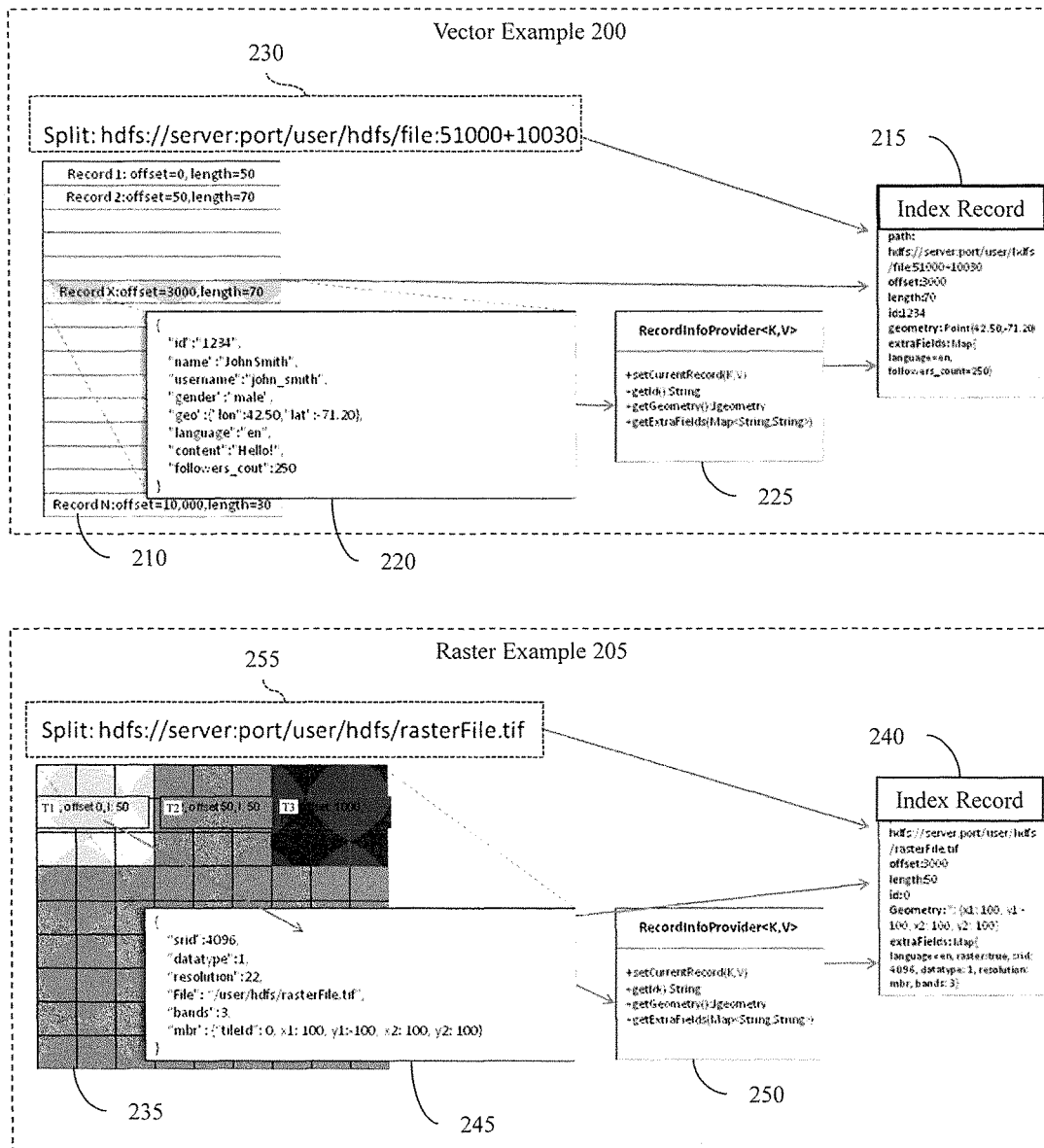
FIG. 2 illustrates one example of generating index records from vector data and raster data.

Accordingly, the computing system 100 generates the local indexes 150 to index each split of the spatial data 145. The splits will be explained further in relation to FIG. 2 and the subsequent discussion. FIG. 2 illustrates a vector example 200 and a raster example 205 in relation to how local indexes are generated by the computing system 100. FIG. 2 will be discussed along with elements of FIG. 1 to illustrate the general functions of the disclosed modules. The vector example 200 illustrates a representative set of vector data 210. The vector data 210 includes a set of vector records that are individual vector geometries in a spatial coordinate system. In one embodiment, the record module 115 divides the vector data 210 shown in the vector example 200 from a larger set of the spatial data 145. Thus, the vector data 210 represents a split of the spatial data 145 and may also be referred to as split 210 that is a subset of the spatial data 145.

As will be discussed in greater detail subsequently, the record module 115, in one embodiment, distributes splits to separate storage devices 105a, 105b-105n to store the splits in the distributed file system and to generate the local indexes 150 in parallel using, for example, a map reduce function. However, for purposes of FIG. 2, generating the local indexes 150 will be discussed from the perspective of the computing system 100.

Accordingly, the record module 115, after dividing the original spatial data 145 to produce at least the split vector data 210, generates an index record 215 for each sub-unit in the split 210. The sub-units are sub-divisions of the split 210. That is, the sub-units are finer abstractions in the granularity of the spatial data 145 than the split 210. In the vector example 200, the sub-units of the split 210 are individual vector records (i.e., vector geometries) as illustrated in separate rows of the split 210. Furthermore, the vector example 200 illustrates an example vector record 220 that is processed by the record module 115 into the index record 215. In one embodiment, the record module 115 includes a set of functions and templates 225 that are specific to vector data to identify the relevant metadata when parsing the record 220 to generate the index record 215.

The record module 115 parses the record 220 to extract metadata (i.e., sub-unit characteristics) about the vector record 220 (i.e., sub-unit) that the record module 115 then uses to populate the index record 215. The record module 115 also extracts information (i.e., split characteristics) from the split 210 and records adjacent to the record 220 in the split 210. For example, the record module 115 extracts a path 230 of where the distributed file system stores the split 210 (i.e., a location in the distributed file system). Thus, the record module 115 produces the index record 215 as an output by using metadata extracted from the record 220 and other portions of the split 210.

Additionally, the record module 115, in one embodiment, also includes the actual vector record 220 as part of the index record 215 to provide additional information within a local index to query. Subsequently, the index module 120 uses the index record 215 and index records about remaining sub-units of the split 210 to produce the local index of the split 210, which will be discussed in greater detail with regards to FIG. 3.

Furthermore, while the computing system 100 is discussed as generating the index record 215 and a local index, in one embodiment, the computing system controls other nodes in the distributed file system to perform these functions on a split by split basis. For example, the computing system 100 provides a split to the device 105a along with a copy of the record module 115 and the index module 120 as instructions for processing the split. The computing system 100 then controls each node to process a respective split in a similar manner as previously discussed. In this way, the processing of the spatial data 145 is distributed among nodes in the distributed file system.

With continued reference to FIG. 2, the record module 115 processes tile "T1" 245 of split 235 to produce index record 240. In FIG. 2, the split 235 is a raster image that is sub-divided into sub-units that are tiles of the raster image. For example, the record module 115 processes the sub-unit "T1" 245, which is a tile of the split 235 (i.e., raster image), to produce the index record 240. In one embodiment, the record module 115 includes a set of functions and templates 250 for processing raster data by identifying metadata from raster tiles (e.g., tile 245) from the split 235. Thus, the record module 115 extracts the metadata from the tile 245 and the split 235 to populate the index record 240.

The index records 215 and 240 may include many different fields storing various information about the record 220 and the tile 245 respectively, in addition to information about the splits 210 and 235, respectively. By storing detailed information regarding the respective record/tile and the split, a resulting local index provides additional information for identifying requested portions of the spatial data 145. For example, the index record 215 is illustrated as including fields for the path 230, an offset, a length, an id, a geometry, and extra fields that specify particular information about data of the record 220, additional aspects of the split 210 or information regarding the broader spatial data 145. The index record 240 includes the path 255, an offset, a length, an id, a geometry, and extra fields identifying information about the split 235 and information about, for example, adjacent tiles.

In further embodiments, the index records stored in a local index may include fields for an identifier of an associated sub-unit, a geometry (i.e., shape and size) of the sub-unit, a start offset that identifies a byte in the original spatial data where the sub-unit begins, and a byte length that identifies a span of the sub-unit in the spatial data 145. The fields may also include a coordinate system for raster images, a data type for pixels of raster images, a resolution, a path identifying a storage location of a raster image (i.e., split) in the distributed file system, a number of bands for a raster image from 1 to N, and a minimum bounding rectangle (MBR) of a raster image along with a descriptor of tiles in the raster image.

Figure 3:
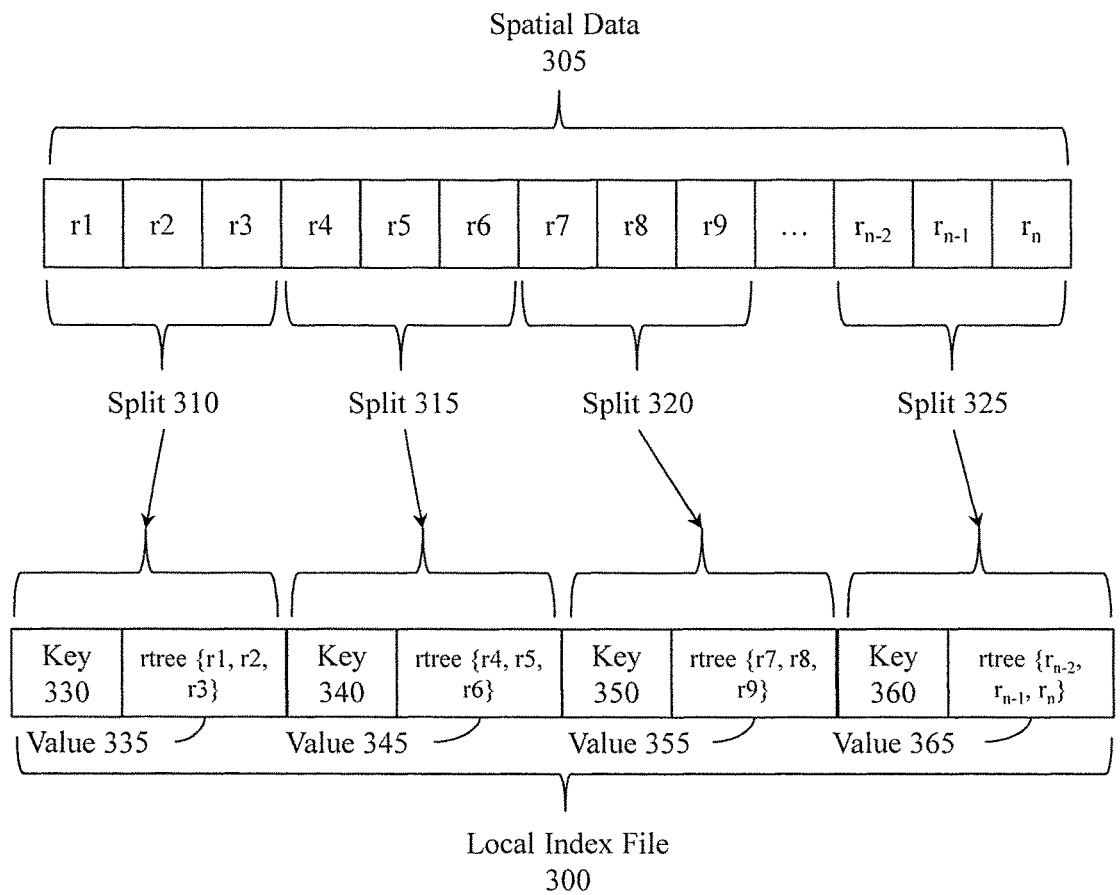
FIG. 3 illustrates one example of a local index file that stores local indexes derived from spatial data.

After the record module 115 produces index records for sub-units in a split, the index module 120 generates a local index for the split. With reference to FIG. 3, one embodiment of a local index file 300 is illustrated. The local index file 300 is, for example, a file that stores local indexes for the spatial data 305. As discussed previously, the record module 115 divides the spatial data 305 into splits. As shown in FIG. 3, the splits include splits 310, 315, 320, and 325 that divide vector data records labeled $r_1$-$r_n$. The index module 120 stores index records produced from the spatial data 305 into local indexes.

In one embodiment, the index module 120 generates an r-tree to store index records of a split. The r-tree is a tree-type electronic data structure that stores the index records in leaf-nodes while parent nodes identify a minimum bounding rectangle of connected/dependent leaf nodes. Thus, a root node of the r-tree identifies a minimum bounding rectangle for a respective split associated with the local index and each subsequent level of nodes specify more specific minimum bounding rectangles within the minimum bounding rectangle of the root node until reaching the leaf nodes with the actual index records. The index module 120 produces one local index per split. Thus, each of the local indexes includes multiple index records with one index record correlating with each sub-unit of a split.

In one embodiment, the index file 300 stores the local indexes as key and value pairs. For example, the local index file 300 may include keys that identify a respective split using [a path+start offset+length] format. This format for the key identifies a location in the spatial data 305 for the split indexed by the local index. A value associated with a key is a local index in the form of an r-tree. Accordingly, as shown in FIG. 3, local indexes for the splits 310, 315, 320 and 325 are respective values 335, 345, 355, 365 while the keys 330, 340, 350, and 360 uniquely identify the local indexes. The index module 120 generates the local index file 300 as an output.

In one embodiment, the local index file 300 is a Hadoop map file that is distributed among the storage devices 105a, 105b through 105n and the computing system 100 of the distributed file system. Accordingly, respective portions of the local index file 300 may reside within a device that stores a respective portion of the spatial data 145.

Furthermore, the index module 120 also produces a global index 155 as an output. The global index 155 is an index of the local indexes 150. For example, the index module 120 generates the global index 155 with a path to the local index file 300, paths to the splits of the spatial data 145, a minimum bounding rectangle for the spatial data as a whole, a number of local indexes in the local index file 300, a list of extra fields used to generate the index records of the local indexes, and an identifying record for each local index. The identifying record for each local index includes a location of the local index and the indexed spatial data, a minimum bounding rectangle associated with spatial data indexed by the local index, and a number of index records stored in the local index. Thus, the global index 155 provides a lookup for the local indexes 150 that improves an efficiency of locating the local indexes 150 and the spatial data 145 associated with the local indexes 150.

Figure 4:
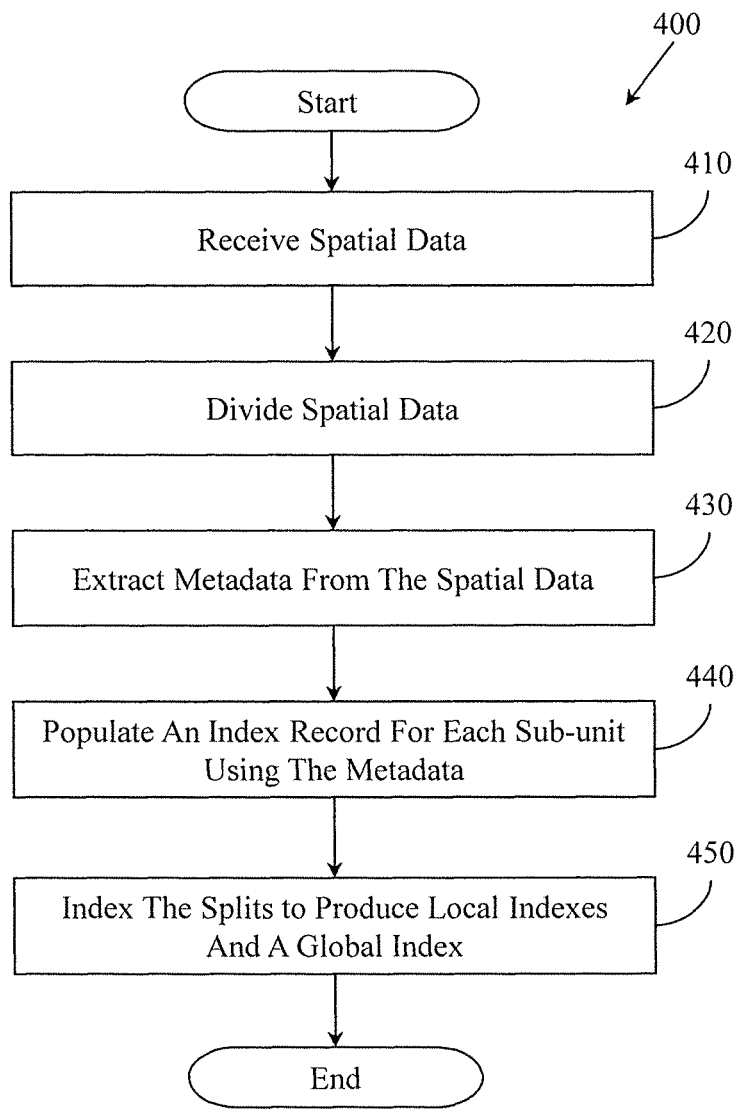
FIG. 4 illustrates an embodiment of a method associated with extracting metadata from spatial data to generate index records for indexing the spatial data.

Further aspects of indexing spatial data will be discussed in reference to FIG. 4. FIG. 4 illustrates one embodiment of a method 400 associated with indexing spatial data. The computing system 100 of FIG. 1 may perform method 400. Thus, method 400 will be discussed from the perspective of the computing system 100.

Method 400 initiates, at 410, when, for example, spatial data 145 that is to be stored in a distributed file system is received. In one embodiment, receiving the spatial data 145 includes buffering the spatial data 145, decoding the spatial data 145 from one or more communications, and storing the spatial data 145 in a memory. As previously discussed, the spatial data 145 may include both raster data and vector data.

Furthermore, in one embodiment, the spatial data 145 may be received in chunks and distributed to the storage devices 105a-n. While the computing system 100 is discussed as performing the method 400, as previously indicated, the computing system 100 may be one device within a distributed file system of many devices 105a-n that carry out the method 400. That is, the computing system 100 may be a master node in a cluster of nodes that also includes the storage devices 105a-n. Thus, the computing system 100 may control the distribution of the spatial data 145 and tasks for processing the spatial data 145 between the nodes.

Thus, the computing system 100, in one embodiment, may not directly perform functions of blocks 430, 440 and 450 of method 400. Instead, the computing system 100 distributes data to the storage devices 105a-n and controls the storage devices 105a-n to perform specified functions of blocks 430, 440 and 450. In this way, the computing system 100 controls processing of the spatial data 145 to occur in parallel among nodes of the cluster. This distributed approach improves, for example, a time to index the data. Of course, in one embodiment, the computing system 100 may also retain one or more splits of the spatial data 145 for local processing according to blocks 430, 440 and 450.

At 420, the spatial data 145 is divided into splits. In one embodiment, dividing the spatial data 145 into the splits includes determining a type of the data (i.e., vector or raster), identifying a unit size for the splits, and storing splits of the divided data in separate data structures. For example, the record module 115 divides the spatial data 145 differently depending on whether the spatial data 145 is raster data or vector data since logical divisions in the spatial data 145 vary depending on a type.

For example, raster data includes separate images. Thus, a logical division of the raster data is to divide the data using whole images. Vector data, however, includes vector records that specify different geometries. The vector records are generally of a smaller size than individual raster images. Consequently, dividing vector data according to individual vector records generates more splits than desired. Thus, in one embodiment, the record module 115 divides vector data by grouping a defined number of records from the vector data together into a split.

As with the raster data, the vector data is divided into splits according to a unit size of the distributed file system. The unit size is, for example, a standard size of a storage block in the distributed file system. Thus, a number of vector records grouped into a split depends, at least in part, on a size of each respective record such that the split does not exceed the unit size.

Accordingly, the record module 115 first analyzes the spatial data 145 to determine whether the spatial data 145 is raster or vector data. After identifying whether the spatial data 145 is raster or vector data, the record module 115 divides the spatial data 145 into the splits. Thus, each split represents a quantity of the spatial data 145 that correlates with a storage block in the distributed file system.

For vector data, each split includes a set of vector records. Thus, each split of vector data includes sub-units that are individual vector records/geometries. In the case of raster data, each split correlates with a single raster image (e.g., satellite photo). In one embodiment, the record module 115 further sub-divides each split (e.g., raster image) into sub-units that are tiles to provide a local index with a refined granularity of information for more specifically searching the split.

Figure 5:
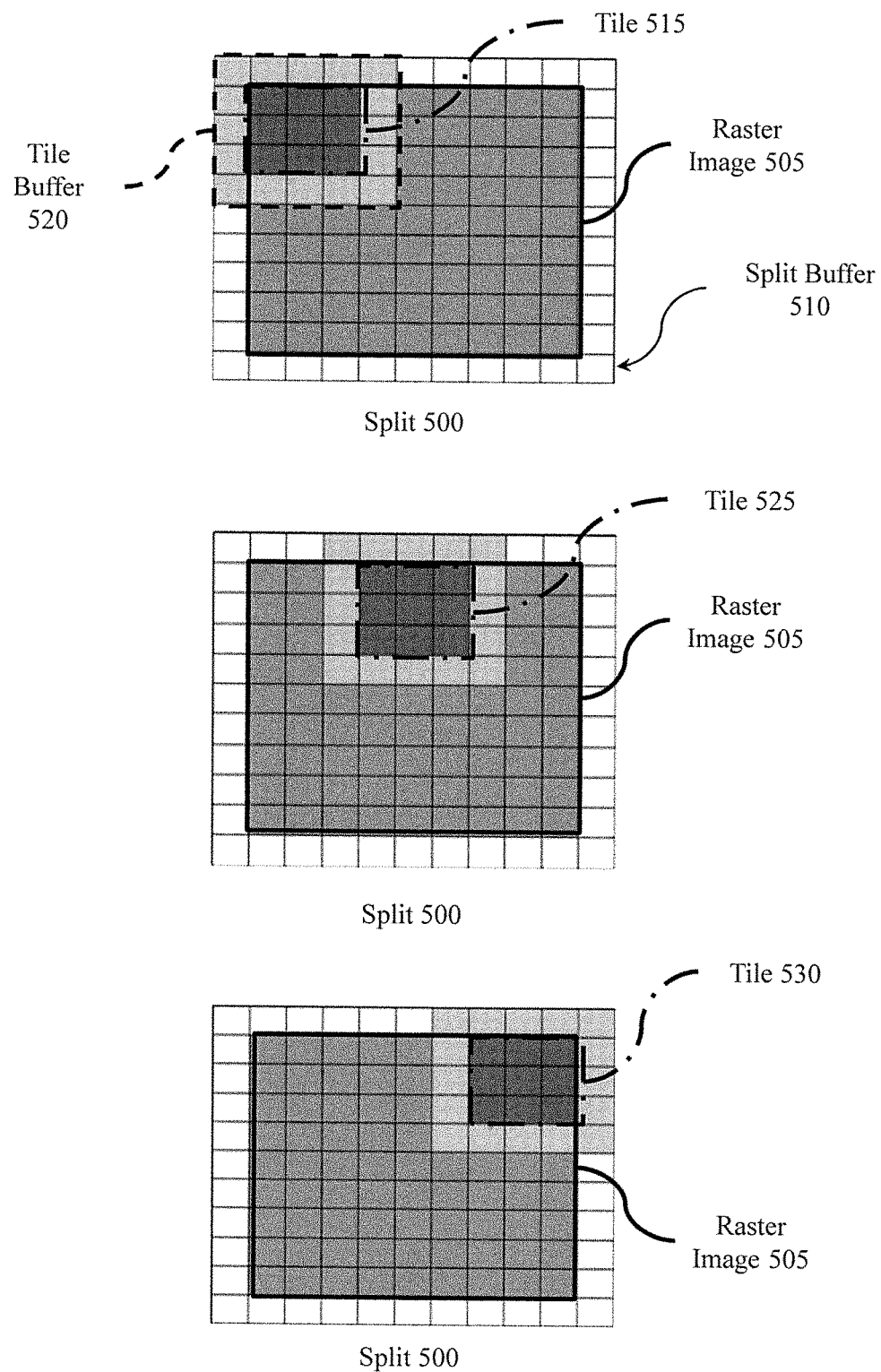
FIG. 5 illustrates one example of dividing a raster image into tiles and buffering each of the tiles.

Briefly consider FIG. 5, which illustrates a split 500 of raster data. The split 500 includes a raster image 505 that is bordered by a split buffer 510. When storing the raster image 505, in one embodiment, the record module 115 buffers the raster image 505 so that when sub-dividing the raster image 505 into sub-units (i.e., tiles), the record module 115 also buffers each of the tiles. As shown in FIG. 5, a first tile 515 is buffered by a tile buffer 520. The tile buffer 520 includes pixels from adjacent tiles to the tile 515 that are from the raster image 505 and also from additional raster images buffered by the record module 115 using the split buffer 510. Accordingly, the record module 115, in one embodiment, divides raster images into sub-units (i.e., tiles) by also including an additional buffer for each tile. FIG. 5 illustrates additional tiles 525 and 530 with respective buffers. The raster image 505 comprises 3 bands/rows of 3 tiles each, however, discussion of the additional six tiles is omitted for purposes of brevity.

By providing the additional buffered pixels for each tile when sub-dividing the splits, the record module 115 stores each tile and with an associated tile buffer to provide for performing functions (e.g., smoothing and other graphics functions) that may use a portion of an adjacent tile without accessing the adjacent tiles since the buffered pixels are already available with the respective tile. In this way, the record module 115 avoids additional accesses to the spatial data 145. Furthermore, the record module 115 provides improved data granularity for the local indexes 150 by analyzing the spatial data 145 at a level of the sub-units instead of wholly at a level of the split.

After dividing the spatial data 145 into splits, in one embodiment, the record module 110 distributes the splits to the storage devices 105a-n to process the splits in parallel and store the splits in the distributed file system. Additionally, in one embodiment, the record module 115 also provides executable instructions in the form of the record module 115 and/or the index module 120. Thus, the computing system 100 may use a map reduce function of the distributed file system to index the data by controlling each of the distributed storage devices 105a-n to perform blocks 430, 440 and 450 and provide the local indexes 150 as an output, as discussed subsequently.

In general, the map reduce function refers to a combination of at least two separate and distinct tasks. The first task, is the map job, which takes a set of data (i.e., a split) and converts it into another set of data (i.e., index records), where individual elements are broken down into tuples (key/value pairs). The second task is a reduce job that uses the output from the map job and combines the tuples into a smaller set of tuples (i.e., local index into global index). As the sequence of the name map reduce implies, the reduce job is performed after the map job. While different implementations of the map reduce function can be implemented, in one embodiment, the map reduce function is a Hadoop MapReduce.

At 430, metadata is extracted from the spatial data 145. In one embodiment, extracting the metadata includes parsing the sub-units, identifying metadata that is to be included in an index record, and temporarily storing the metadata. For example, the record module 115 parses each sub-unit of a split to identify metadata that correlates with a defined set of characteristics to be included within each of the index records. The defined set of characteristics are, for example, fields that describe different attributes of a respective sub-unit and associated split and that the record module 115 includes in each of the index records.

Thus, the metadata extracted from the sub-units describes different aspects of the spatial data 145 itself. Of course, the set of defined characteristics for raster data may vary from those for vector data since the underlying data includes fundamental differences that are expressed in the associated metadata. Accordingly, each type of data may have a separate set of defined characteristics that dictate which metadata the record module 115 extracts.

In either case, the extracted metadata is used, at 440, to populate index records. In one embodiment, populating an index record includes generating an electronic data structure that defines the index record, filling the electronic data structure with the related metadata, and storing the electronic data structure. For example, the record module 115 takes the metadata extracted from a sub-unit and uses the metadata to populate fields of an associated index record. The record module 115 may also use metadata about other sub-units and/or about the spatial data 145 as a whole to fill in the index record of the sub-unit according to which fields the set of defined characteristics specify. Additionally, the record module 115, in one embodiment, populates index records with non-spatial data that relates to the spatial data 145 to provide additional query criteria when searching the spatial data 145.

Furthermore, in one embodiment, in addition to storing metadata in an index record, the record module 115 also stores actual data of the sub-unit (e.g., vector geometry) in the index record. Storing the actual spatial data in the index records further improves an efficiency of accessing the spatial data 145 and also provides for using the geometry as possible additional search criteria. Alternatively, the record module 115 populates an index record with a path of a location for an associated sub-unit (e.g., tile or a raster image) in the distributed file system.

At 450, the spatial data is indexed to produce a global index and local indexes. In one embodiment, indexing includes generating electronic data structures for each of the splits, storing index records in the electronic data structures, populating identifiers of the splits with coordinate information, storing the electronic data structures in a file, generating a global index file, populating the global index with information about local indexes and storing the global index file.

In one embodiment, the index module 120 generates the local indexes 150 using the index records that include relevant information about each of the sub-units. For example, the index module 120 generates one local index for each of the splits. Thus, sub-units of each of the splits are separately indexed within an individual local index. The index module 120 generates an r-tree, which is a type of tree data structure, to store the index records for a split. Thus, the r-tree is the local index of the split. In general, the r-tree is an electronic data structure that stores the index records and also stores coordinates (i.e., minimum bounding rectangles (MBR)) associated with sub-units identified by the index records.

In one example, the index module 120 populates the generated r-tree by storing index records in leaf nodes of the r-tree. The index module 120 initially, for example, sorts the index records for a split according to coordinates that define a sub-unit for each of the index records. In one embodiment, the coordinates are a minimum bounding rectangle (MBR). Thereafter, the index module 120 stores the index records in leaf nodes of the r-tree in the sorted order.

The index module 120 stores index records with a close spatial proximity in leaf nodes that have common parent nodes. In other words, the r-tree may include two, three or more levels of nodes depending on, for example, a number of leaf nodes and/or a desired level of specificity of the coordinates. Thus, in one embodiment, the index module 120 generates a root node (i.e., primary or top node of the r-tree) of the r-tree to specify an overall minimum bounding rectangle (MBR) of spatial data indexed by the r-tree. Each subsequent level of nodes (i.e., child nodes) down from the root node specify a narrower region of a minimum bounding rectangle of a parent node.

Viewed from the perspective of the leaf nodes, each subsequent level of parent nodes up from a leaf node specify a broader MBR until reaching the root node. That is, leaf nodes that depend from a parent node include index records related to sub-units of a split for which the parent node specifies a first MBR inclusive of the sub-units. A subsequent level up and a parent node specifies a second MBR inclusive of the first MBR. However, the second MBR is broader and also includes coordinates spanning additional sub-units of the split stored in other leaf nodes of the r-tree. Accordingly, the r-tree, when implemented as a local index, provides for efficiently locating relevant index records according to at least coordinates specified in the nodes of the r-tree.

Finally, the index module 120 outputs the local indexes 150 to a map file to be stored in the distributed file system. In one embodiment, each of the local indexes is stored within an entry in the map file that includes a key/value pair. The key is, for example, a split identifier in the form of a file path to the split in the distributed file system. The value is the associated local index. The map file is stored in the distributed file system in a distributed manner. That is, the storage devices 105a-n including the computing system 100 each store a portion of the map file.

In one embodiment, a portion of a map file stored in a particular one of the storage devices 105a-n correlates with spatial data 145 stored in the particular storage device. In this way, a local index and the associated split may be stored in a same device for more efficient access.

As part of indexing, at 450, the index module 120 also generates a global index. In general, the global index 155 is an index of the local indexes 150. That is, the global index 155 is generated to track information about the local indexes 150 so that identifying and locating a relevant local index for a query is efficient. The index module 120 collects metadata about each of the local indexes generated for the spatial data 145. The metadata about a local index includes, for example, an MBR for the local index, a number of indexed elements (i.e., number of sub-units), and a file path in the distributed file system that identifies a storage location of the local index.

The index module 120 aggregates the metadata from throughout the distributed file system by collecting the metadata about the local indexes from, for example, the storage devices 105*a-n*. Subsequently, the index module 120 sorts the aggregated records according to, for example, the minimum bounding rectangle (MBR) for each local index. The index module 120 stores the metadata as entries in, for example, a table to generate the global index 155. In this way, the local indexes 150 can be efficiently identified by the query module 125 when servicing a query.

Figure 6:
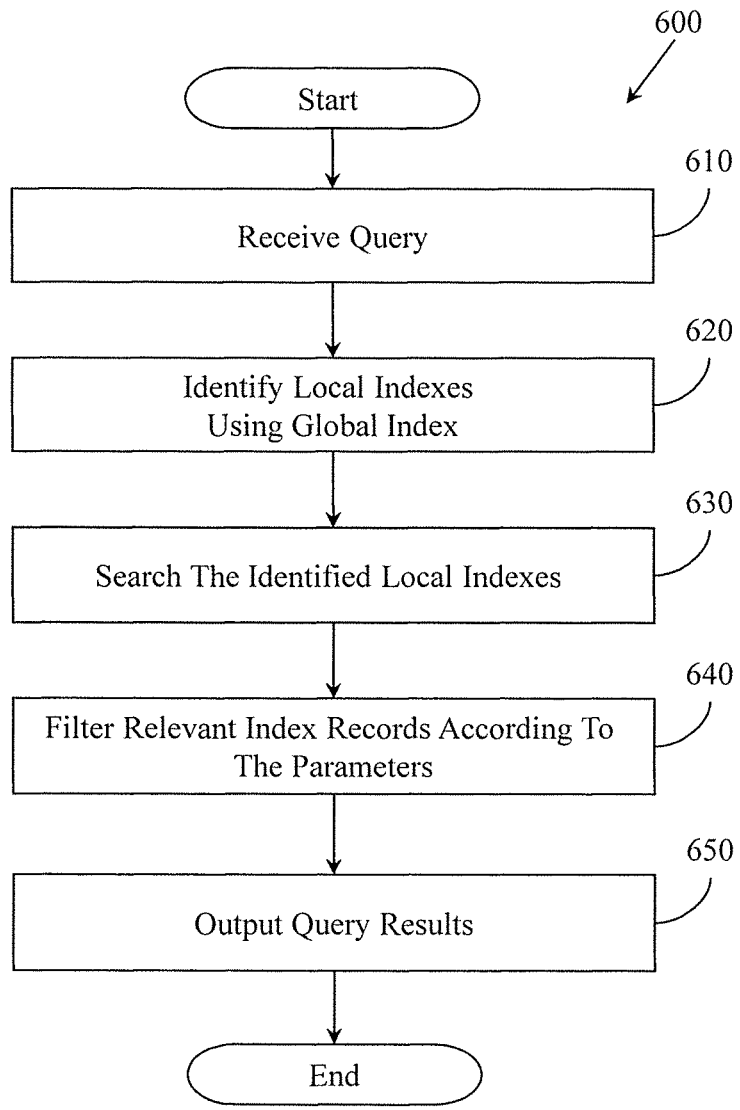
FIG. 6 illustrates one embodiment of a method associated with querying spatial data using local indexes.

With reference to FIG. 6, one embodiment of a method 600 associated with using local indexes to query spatial data is illustrated. Method 600 will be discussed from the perspective of the computing system 100 of FIG. 1.

Method 600 initiates, at 610, in response to receiving a communication that includes a query of the spatial data 145. In one embodiment, receiving the communication includes buffering the communication, decoding the communication to identify the query, and storing the query in a memory.

For example, the query module 125 receives the query in the communication and initially extracts query parameters from the communication. The communication is from, for example, a remote device that is requesting spatial data in order to use the spatial data for display or another function. In general, the query is directed to the spatial data 145 as a whole and, thus, is to both vector data and raster data unless specifically identified otherwise in the query. In one embodiment, the query parameters include a query window, a spatial interaction, and values of extra fields.

The query window defines a geometry for filtering data. That is, for example, the query window may indicate a region (e.g., rectangle or polygon with specific coordinates) within the spatial coordinate system. The query window may be a geometry (e.g., rectangle, triangle) defined with the spatial coordinate system from which a minimum bounding rectangle (MBR) is, for example, derived. The spatial interaction defines how a record is to interact with the query window to be considered relevant to the query. That is, the spatial interaction may indicate criteria of "is inside," "is outside," "is incident to," and so on. As one example, if the query indicates a specific region and the "is inside" interaction, then records with a spatial component inside of the query window are returned.

Furthermore, the values of the extra fields component specifies values of the additional fields of the index records that are used to further filter results. For example, the extra fields component may indicate "red houses" as a component of filtering addresses returned by a query when one of the extra fields also specifies a field for house color.

At 620, local indexes are identified that match the query parameters. In one embodiment, identifying local indexes includes loading the global index, parsing the global index using coordinates specified by the query window, and indicating which of the local indexes match the query window. For example, the query module 125 uses the global index 155 to search the local indexes 150 to identify a set of identified local indexes. The identified local indexes are indexes with a root node MBR that matches the query window according to the noted spatial interaction.

Thus, the query module 125 produces a list of the local indexes that match the query window. The list may specify a path for each of the identified local indexes so that the identified local indexes can be read from the map file. Furthermore, identifying the local indexes includes, in one embodiment, reading the local indexes from the map file and issuing the identified local indexes to separate mappers (i.e., storage devices 105*a-n*) to be processed using a map reduce command in the distributed file system. Thus, the computing system 100 controls the storage devices 105*a-n* to perform functions discussed with, for example, block 630 in parallel on separate indexes of the identified local indexes to distribute the processing of the query throughout the distributed file system.

At 630, the set of identified local indexes is searched to locate relevant index records that match the query window. In one embodiment, searching the identified local indexes includes reading the indexes from the local index map file in the distributed file system, distributing the identified local indexes to separate mappers (i.e., storage devices 105*a-n*), traversing the local indexes, and returning relevant index records from the identified local indexes. Alternatively, in one embodiment, at least a portion of the identified local indexes are searched by the computing system 100 instead of being distributed.

For example, the query module 125 uses information in the list of identified local indexes to read the identified indexes from the map file. The list includes, for example, a path in the distributed file system for each of the identified local indexes. Thus, the query module 125 reads the identified local indexes using the provided paths.

Furthermore, in one embodiment, the query module 125 uses a Hadoop MapReduce command, in a similar manner as discussed in relation to method 400, to search the identified local indexes at 630 and filter the results at 640. In this way, the processing is performed in parallel across the cluster of devices (i.e., the storage devices 105*a-n*) with the filtered results being provided back to the query module 125. For example, the computing system 100, after initially identifying local indexes at 620, in one embodiment, distributes requests for the query to separate nodes in the distributed file system to execute the search on individual local indexes and return filtered results from 640. In this way, the computing system 100 can control the storage devices 105*a-n* to distribute the searching task.

With more specific detail regarding the searching, at 630, in general the query module 125 searches the identified local indexes to identify index records in the leaf nodes that interact with the query window. That is, in one embodiment, the query module 125 traverses each of the identified local indexes by comparing nodes in the r-trees with the query window to determine whether leaf nodes interact with the query window. Upon identifying leaf nodes that interact with the query window, the query module 125 reads the associated index record from the map file into, for example, a temporary storage to provide relevant index records.

At 640, the relevant index records are filtered according to filtering parameters identified within the query. In one embodiment, filtering includes reading the index relevant index records, comparing the filtering parameters with values of extra fields in the index records, and writing index records that match the filtering parameters to a results file. For example, the query module 125 uses one or more filtering parameters received with the query to filter the relevant index records. The filtering parameters include, for example, text or other defined values (e.g., data types, one of a set of possible values, etc.) in regards to one or more of the fields in the index records. In one embodiment, the filtering parameters specifically relate to one or more of the extra fields included with the index records that store, for example, parts of the actual original spatial data, extra extracted information about the spatial data and so on.

In either case, filtering the relevant index records refines the index records to provide a precise set of results in comparison to searching spatial data without extra fields and the filtering. In this way, additional accesses to the local indexes and extra accesses to the spatial data 145 to retrieve further information are avoided thereby improving operation of the computing system 100, the distributed file system, and the communications network 110.

At 650, a file including results of the query is provided as an output. In one embodiment, providing the results includes generating a results file, populating the results file with the refined index records, and storing the results file. For example, the query module 125 writes the results to a results file and, in one embodiment, provides the results file in response to the communication including the original query. That is, the query module 125 controls the computing system 100 to transmit the results file in a response communication to an originator of the query over the network 110.

Alternatively, at 650, spatial data 145 for each of the identified index records is read from the distributed file system and provided in response to the original query. Of course, if the index record is for vector data, then the vector record may already be provided if previously stored in the index record itself. Otherwise, the vector record or raster tile of a raster image is retrieved using a path provided in the index record.

Figure 7:
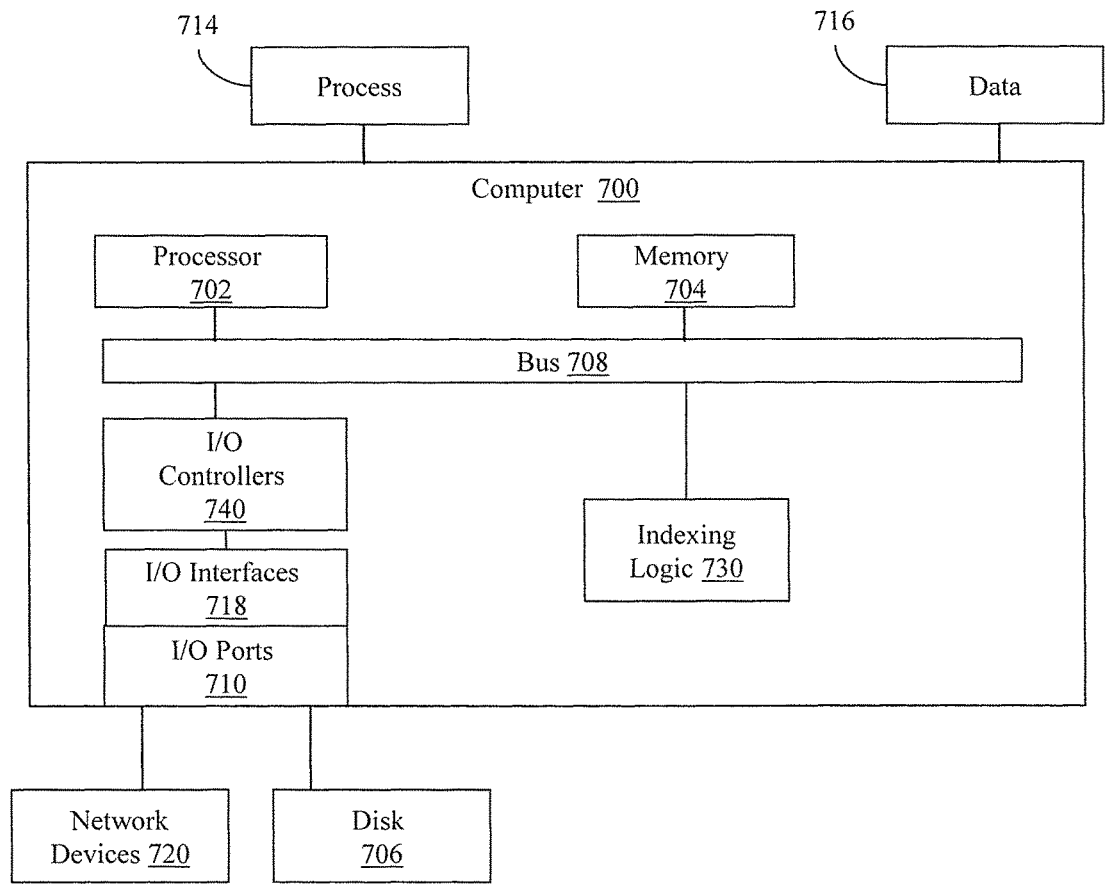
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The example computing device may be a computer 700 that includes a processor 702, a memory 704, and input/output ports 710 operably connected by a bus 708. In one example, the computer 700 may include indexing logic 730 configured to facilitate generating local indexes and a global index of the local indexes similar to computing system 100 shown in FIG. 1. In different examples, the logic 730 may be implemented in hardware, a non-transitory computer-readable medium with stored instructions, firmware, and/or combinations thereof. While the logic 730 is illustrated as a hardware component attached to the bus 708, it is to be appreciated that in other embodiments, the logic 730 could be implemented in the processor 702, stored in memory 704, or stored in disk 706.

In one embodiment, logic 730 or the computer 700 is a means (e.g., structure: hardware, non-transitory computer-readable medium, firmware) for performing the actions described. In some embodiments, the computer 700 may be a server operating in a cloud computing system, a server configured in a Software as a Service (SaaS) architecture, a smartphone, laptop, tablet computing device, and so on.

The means may be implemented, for example, as an ASIC programmed to receive spatial data, parse the spatial data to extract metadata, generate index records and produce local indexes from the index records. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing generating a global index of the local indexes that is useful for querying the spatial data in an efficient manner while avoiding redundant accesses to the spatial data.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output (I/O) interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD-ROM, and so on. The memory 704 can store a process 714 and/or a data 716, for example. The disk 706 and/or the memory 704 can store an operating system that controls and allocates resources of the computer 700.

The computer 700 may interact with input/output (I/O) devices via the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer-executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium," as used herein, refers to a non-transitory medium that stores instructions and/or data configured to perform one or more of the disclosed functions when executed by at least a processor. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic," as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium storing instructions that when executed by one or more processors cause the one or more processors to perform at least:

in response to receiving spatial data that is to be stored in a distributed file system, analyzing the spatial data to determine which portions of the spatial data are raster data and which portions of the data are vector data;

dividing the spatial data into splits, wherein a split of spatial data determined to be raster data is a single raster image, and a split of spatial data determined to be vector data is a group of vector records, wherein each of the splits includes a portion of the spatial data and includes additional sub-units that further sub-divide the spatial data to provide a fine granularity of data for indexing;

populating index records for the sub-units using metadata extracted from vector sub-units of the spatial data by parsing a vector record of the sub unit and adjacent vector records, and from raster sub-units of the spatial data by retrieving information describing the raster sub-unit, wherein the metadata for each of the sub-units describes (i) sub-unit characteristics of a respective one of the sub-units and (ii) split characteristics of one of the splits associated with the respective one of the sub-units; and indexing the spatial data by (i) generating a respective local index of key and value pairs for each of the splits using the index records for the sub-units wherein the key identifies the split based on a file path, start offset, and length to identify the location within the spatial data for the split, and (ii) generating a global index that identifies the local indexes and at least a minimum bounding rectangle (MBR) for each of the local indexes that is associated with a respective one of the splits, wherein the local indexes include records for both vector data and raster data.

2. The non-transitory computer-readable medium of claim 1, wherein indexing the spatial data by generating the local indexes includes generating a separate r-tree as each of the local indexes by populating (i) leaf nodes of the r-tree with the index records of one of the splits and (ii) parent nodes of the r-tree with coordinates within a spatial coordinate system related to spatial data described by the index records of the leaf nodes, wherein the r-tree is an electronic data structure that stores the index records and the coordinates for one of the splits, and wherein populating the r-tree with the index records provides the metadata about the spatial data within the local indexes and without separately accessing the spatial data in the distributed file system.

3. The non-transitory computer-readable medium of claim 1, wherein the sub-units of one of the splits are tiles of the single raster image or individual vector records, wherein dividing the spatial data for vector data includes grouping individual vector records of the vector data to form each of the splits, wherein dividing the spatial data when the spatial data is raster data includes dividing each of the splits into tiles and buffering each of the tiles with a buffered portion of each adjacent tile within a respective one of the splits, wherein the sub-units for the raster data include the buffered portion to provide for accessing the tile without accessing additional adjacent tiles, and wherein indexing the spatial data includes indexing the vector data and the raster data together in the local indexes.

4. The non-transitory computer-readable medium of claim 1, wherein dividing the spatial data into splits includes dividing the spatial data according to a unit size that is a size of a defined storage unit in the distributed file system, wherein an index record for a respective one of the sub-units is an electronic data structure that stores at least metadata about the respective one of the sub-units, wherein each of the index records store a path to a storage location for a respective one of the sub-units, wherein populating the index records includes parsing each of the splits to identify and extract the metadata according to a defined set of characteristics to be included within each of the index records, and wherein the defined set of characteristics specify fields describing one of the sub-units in addition to extra fields describing the spatial data or including portions of the one of the sub-units.

5. The non-transitory computer-readable medium of claim 1, wherein indexing the spatial data further includes:

sorting the local indexes according to a minimum bounding rectangle (MBR) associated with each of the local indexes, wherein the minimum bounding rectangle (MBR) for each of the splits identifies an area within the spatial coordinate system associated with each of the splits indexed by a respective one of the local indexes;

storing the sorted local indexes in a map file with each of the local indexes separately identified according to a respective one of the splits; and aggregating index metadata that describes the local indexes to form the global index by storing at least a minimum bounding rectangle (MBR) associated with each of the local indexes in the global index.

6. The non-transitory computer-readable medium of claim 1, further comprising instructions that when executed by the one or more processors cause the one or more processors to perform at least:

in response to receiving a communication that includes a query of the spatial data, identifying, using the global index, one or more of the local indexes that include index records matching a query window of the query by comparing the query window with a minimum bounding rectangle (MBR) for each of the local indexes to output a set of identified local indexes;

searching the set of identified local indexes to locate relevant index records that match the query window; and filtering the relevant index records according to filtering parameters from the query by comparing the filtering parameters with one or more specified fields of the relevant index records to produce a refined output of index records that satisfy the filtering parameters, wherein the comparing includes using data of extra fields within the relevant index records to compare with the filtering parameters.

7. The non-transitory computer-readable medium of claim 6, wherein the query window defines a geometry that represents a defined space in the spatial coordinate system within which requested records are queried, and wherein the index records include at least a minimum bounding rectangle (MBR) for an associated one of the splits, an MBR for an associated one of the sub-units, and a file path for a location of the associated one of the splits in the distributed file system.

8. The non-transitory computer-readable medium of claim 6,
wherein searching the set of identified local indexes includes distributing individual local indexes from the set of identified local indexes to separate devices in the distributed file system that independently execute searches on indexes in the set of identified local indexes to locate the relevant index records,
wherein the searching and the filtering are executed as a map-reduce function in the distributed file system among the devices, and
wherein the devices are distributed storage devices of the distributed file system.

9. The non-transitory computer-readable medium of claim 1,
wherein dividing the spatial data includes distributing the splits to separate devices in the distributed file system to generate the local indexes in parallel among the separate devices and to separately store the splits among the devices,
wherein the populating and the indexing are executed together as a map-reduce function,
wherein a map file that stores the local indexes is a Hadoop map file, and
wherein the distributed file system is a Hadoop distributed file system (HDFS).

10. A computing system, comprising:
a processor;
a memory coupled to the processor and storing:
a record module including instructions that when executed by the processor cause the processor to perform at least:
in response to receiving spatial data that is to be stored in a distributed file system, analyzing the spatial data to determine which portions of the spatial data are raster data and which portions of the data are vector data;
dividing the spatial data into splits, wherein a split of spatial data determined to be raster data is a single raster image, and a split of spatial data determined to be vector data is a group of vector records, wherein each of the splits includes a portion of the spatial data and includes additional sub-units that further subdivide the spatial data to provide a fine granularity of data for indexing;
populating index records for the sub-units using metadata extracted from vector sub-units of the spatial data by parsing a vector record of the sub unit and adjacent vector records, and from raster sub-units of the spatial data by retrieving information describing the raster sub-unit, wherein the metadata for each of the sub-units describes (i) sub-unit characteristics of a respective one of the sub-units and (ii) split characteristics of one of the splits associated with the respective one of the sub-units; and
an index module including instructions that when executed by the processor cause the processor to perform at least:
indexing the spatial data by (i) generating a respective local index of key and value pairs for each of the splits using the index records for the sub-units wherein the key identifies the split based on a file path, start offset, and length to identify the location within the spatial data for the split, and (ii) generating a global index that identifies the local indexes and at least a minimum bounding rectangle (MBR) for each of the local indexes that is associated with a respective one of the splits, wherein the local indexes include records for both vector data and raster data.

11. The computing system of claim 10,
wherein the index module includes instructions for indexing the spatial data by generating the local indexes including instructions for generating a separate r-tree as each of the local indexes by populating (i) leaf nodes of the r-tree with the index records of one of the splits and (ii) parent nodes of the r-tree with coordinates within a spatial coordinate system related to spatial data described by the index records of the leaf nodes,
wherein the r-tree is an electronic data structure that stores the index records and the coordinates for one of the splits, and
wherein the index module includes instructions for populating the r-tree with the index records to provide the metadata within the local indexes and without separately accessing the spatial data in the distributed file system.

12. The computing system of claim 10,
wherein each of the splits is a single raster image or a group of vector records,
wherein the sub-units of one of the splits are tiles of the single raster image or individual vector records,
wherein the record module includes instructions for dividing the spatial data for vector data by grouping individual vector records of the vector data to form each of the splits,
wherein the record module includes instructions for dividing the spatial data when the spatial data is raster data by dividing each of the splits into tiles and buffering each of the tiles with a buffered portion of each adjacent tile within a respective one of the splits,
wherein the sub-units for the raster data include the buffered portion to provide for accessing the tile without accessing additional adjacent tiles,
wherein the indexing module includes instructions for indexing the spatial data by indexing the vector data and the raster data together in the local indexes.

13. The computing system of claim 10,
wherein the record module includes instructions for dividing the spatial data into splits by dividing the spatial data according to a unit size that is a size of a defined storage unit in the distributed file system,
wherein an index record for a respective one of the sub-units is an electronic data structure that stores at least metadata about the respective one of the sub-units,
wherein each of the index records store a path to a storage location in the distributed file system for a respective one of the sub-units,
wherein the record module includes instructions for populating the index records by parsing each of the splits to identify and extract the metadata according to a defined set of characteristics to be included within each of the index records, and
wherein the defined set of characteristics specify fields describing one of the sub-units in addition to extra fields describing the spatial data or including portions of the one of the sub-units.

14. The computing system of claim 13,
wherein the computing system is a node in the distributed file system,
wherein the record module includes instructions for dividing the spatial data by distributing the splits to separate devices in the distributed file system to control the devices to generate the local indexes in parallel and separately store the splits among the devices, wherein the record module includes instructions that initiate a map reduce function to perform the populating and the indexing within the distributed file system, wherein the index module includes instructions that store the local indexes in a Hadoop map file, and wherein the distributed file system is a Hadoop distributed file system (HDFS).

15. The computing system of claim 13, wherein the memory further stores a query module including instructions that when executed by the processor cause the processor to perform at least:

in response to receiving a communication that includes a query of the spatial data, identifying, using the global index, one or more of the local indexes that include index records matching a query window by comparing the query window with a minimum bounding rectangle (MBR) for each of the local indexes to output a set of identified local indexes;

searching the set of identified local indexes to locate relevant index records that match the query window; and filtering the relevant index records according to filtering parameters from the query to produce a refined output of index records that satisfy the filtering parameters, wherein the filtering includes using data of extra fields within the relevant index records to compare with the filtering parameters.

16. A computer-implemented method, the method comprising:

in response to receiving spatial data that is to be stored in a distributed file system, analyzing the spatial data to determine which portions of the spatial data are raster data and which portions of the data are vector data;

dividing the spatial data into splits, wherein a split of spatial data determined to be raster data is a single raster image, and a split of spatial data determined to be vector data is a group of vector records, wherein each of the splits includes a portion of the spatial data and includes additional sub-units that further sub-divide the spatial data to provide a fine granularity of data for indexing;

populating index records for the sub-units using metadata extracted from vector sub-units of the spatial data by parsing a vector record of the sub unit and adjacent vector records, and from raster sub-units of the spatial data by retrieving information describing the raster sub-unit, wherein the metadata for each of the sub-units describes (i) sub-unit characteristics of a respective one of the sub-units and (ii) split characteristics of one of the splits associated with the respective one of the sub-units; and indexing the spatial data by (i) generating a respective local index of key and value pairs for each of the splits using the index records for the sub-units wherein the key identifies the split based on a file path, start offset, and length to identify the location within the spatial data for the split, and (ii) generating a global index that identifies the local indexes and at least a minimum bounding rectangle (MBR) for each of the local indexes that is associated with a respective one of the splits, wherein the local indexes include records for both vector data and raster data.

17. The computer-implemented method of claim 16, wherein indexing the spatial data by generating the local indexes includes generating a separate r-tree as each of the local indexes by populating (i) leaf nodes of the r-tree with the index records of one of the splits and (ii) parent nodes of the r-tree with coordinates within a spatial coordinate system related to spatial data described by the index records of the leaf nodes, wherein the r-tree is an electronic data structure that stores the index records and the coordinates for one of the splits, and wherein populating the r-tree with the index records provides the metadata about the spatial data within the local indexes and without separately accessing the spatial data in the distributed file system.

18. The computer-implemented method of claim 16, wherein each of the splits is a single raster image or a group of vector records, wherein the sub-units of one of the splits are tiles of the single raster image or individual vector records, wherein dividing the spatial data for vector data includes grouping individual vector records of the vector data to form each of the splits, wherein dividing the spatial data when the spatial data is raster data includes dividing each of the splits into tiles and buffering each of the tiles with a buffered portion of each adjacent tile within a respective one of the splits, wherein the sub-units for the raster data include the buffered portion to provide for accessing the tile without accessing additional adjacent tiles, and wherein indexing the spatial data includes indexing the vector data and the raster data together in the local indexes.

19. The computer-implemented method of claim 16, wherein dividing the spatial data into splits includes dividing the spatial data according to a unit size that is a size of a defined storage unit in the distributed file system, wherein an index record for a respective one of the sub-units is an electronic data structure that stores at least metadata about the respective one of the sub-units, wherein each of the index records store a path to a storage location for a respective one of the sub-units, wherein populating the index records includes parsing each of the splits to identify and extract the metadata according to a defined set of characteristics to be included within each of the index records, wherein the defined set of characteristics specify fields describing one of the sub-units in addition to extra fields describing the spatial data or including portions of the one of the sub-units.

20. The computer-implemented method of claim 16, further comprising:

in response to receiving a communication that includes a query of the spatial data, identifying, using the global index, one or more of the local indexes that include index records matching a query window by comparing the query window with a minimum bounding rectangle (MBR) for each of the local indexes to output a set of identified local indexes;

searching the set of identified local indexes to locate relevant index records that match the query window; and filtering the relevant index records according to filtering parameters from the query by comparing the filtering parameters with one or more specified fields of the relevant index records to produce a refined output of index records that satisfy the filtering parameters, wherein the comparing includes using data of extra fields within the relevant index records to compare with the filtering parameters.

* * * * *